Figure 1:
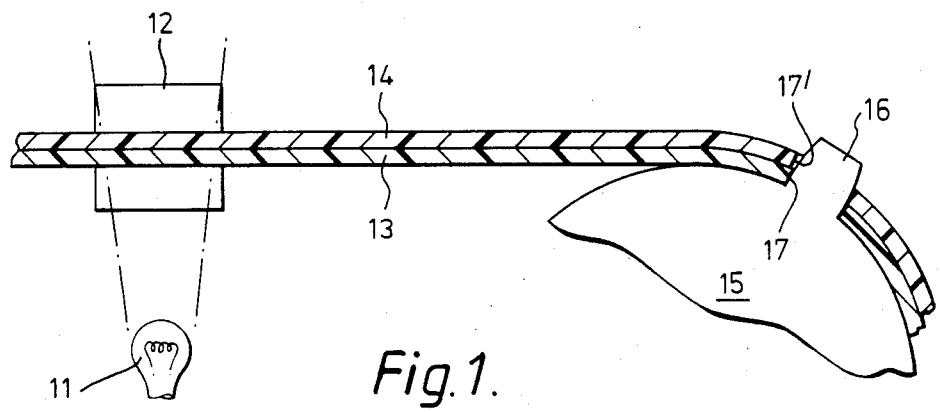

United States Patent [19]

Gooch et al.

[11] Patent Number: 4,572,660
[45] Date of Patent: Feb. 25, 1986

[54] PHOTOGRAPHIC FILM COPYING APPARATUS

[75] Inventors: Ian D. Gooch; Ian G. Thom, both of Edinburgh, Scotland

[73] Assignee: Ferranti plc, Cheshire, England

[21] Appl. No.: 586,834

[22] Filed: Mar. 6, 1984

[30] Foreign Application Priority Data

Mar. 11, 1983 [GB] United Kingdom ............... 8306841

[51] Int. Cl.⁴ ............................................. G03B 27/04
[52] U.S. Cl. ..................................... 355/99; 242/75.2
[58] Field of Search ................ 355/77, 90, 99, 103, 355/104, 108–111; 352/97; 226/2, 27, 38, 39, 195; 242/75.3, 75.4, 75.2; 271/98, 102, 106

[56] References Cited

U.S. PATENT DOCUMENTS

| | | | |
|---|---|---|---|
| 1,598,756 | 9/1926 | Troland | 355/99 |
| 1,981,069 | 11/1934 | Ramsey | 355/90 |
| 2,994,489 | 8/1961 | Hare | 242/75.2 |
| 3,032,245 | 5/1962 | George et al. | 242/75.2 |

FOREIGN PATENT DOCUMENTS

| | | | |
|---|---|---|---|
| 160387 | 9/1957 | Sweden | 242/75.2 |
| 165510 | 3/1934 | Switzerland | 242/75.2 |

Primary Examiner—L. T. Hix
Assistant Examiner—Della Rutledge
Attorney, Agent, or Firm—Kerkam, Stowell, Kondracki & Clarke

[57] ABSTRACT

In film copying apparatus (FIG. 3) in which a master film 13 and unexposed copy film 13 are drawn past an exposure gate 12 by a drive sprocket 15, the sprocket teeth 16 have a curved profile which engage with film sprocket holes such that the upper film lags behind the lower and the copy is incorrectly aligned with respect to the sprocket holes. Film strip registration means for correcting misalignment at the exposure gate comprises suction means 20 having a vacuum chamber 21 with apertured pad 23 by which the copy film is diverted out of the plane of the master film thereby increasing its path length between exposure gate and drive sprocket and advancing it at the exposure gate to re-establish registration with the master film.

5 Claims, 4 Drawing Figures

PHOTOGRAPHIC FILM COPYING APPARATUS

This invention relates to copying one photographic film strip onto another and in particular for controlling registration between the two strips at the exposure gate.

Photographic film strips are used in navigational instruments such as moving-map displays, to indicate position by locating a transparency of a map with respect to a reading datum in response to signals provided by position sensors. In practice a plurality of such transparancies are required and are stored as frames on a strip of film. Clearly the instrument must be able to position the strip accurately, for which sprocket holes in the film are used, and the film must be prepared accurately, that is each frame must be of the correct dimensions and location with respect to the sprocket holes.

For any particular region in which a number of instruments are to operate, a plurality of identical film strips are required. Such strips may be copied by running an unexposed copy film strip in contact with a master film strip through an exposure gate, by means of a common drive sprocket which in locating both sets of sprocket holes on the same sprocket teeth should ensure that the image of the newly exposed film is in the correct position relative to the sprocket holes of the strip.

However, in commercially available copiers the drive sprockets are provided with curved profile teeth as shown in the sectional elevation of FIG. 1, which causes a slight lagging of the upper strip relative to the lower one.

This longitudinal displacement of the two strips is small and for non-critical applications is usually neglected but where accuracy is paramount such a displacement error of one of the strips at the exposure gate must be eliminated to ensure registration at the exposure gate.

It is an object of the present invention to provide film registration means for film strip copying apparatus of the type described which mitigates the above outlined disadvantages.

According to the present invention film strip registration means for film copying apparatus of the type in which contiguous strips of film are pulled past an exposure gate by a drive sprocket engaging in holes in the film strips and which by virtue of the sprocket teeth profile, introduces a longitudinal displacement between strips comprises diversion means operable to divert the path of the lagging strip out of the plane of the path taken by the other between the exposure gate and the drive sprocket by an amount which causes said lagging strip to be longitudinally advanced, relative to the other, at the exposure gate by the same amount as the longitudinal displacement introduced by the drive sprocket teeth.

Preferably the diversion means comprises suction means operable to hold the film strip in contact therewith as the strip is moved past and positioning means operable to move the suction means perpendicularly to the plane containing the direction of motion of the film strip.

Figure 2:
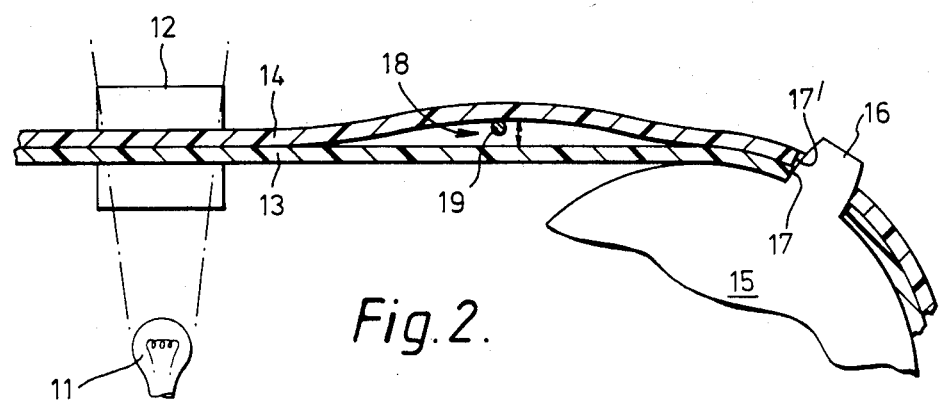
Figure 3:
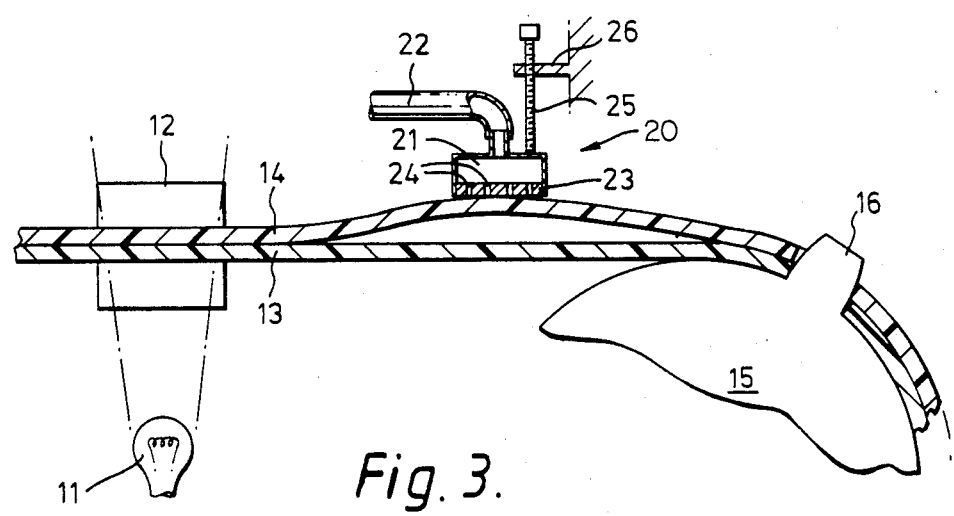
Figure 4:
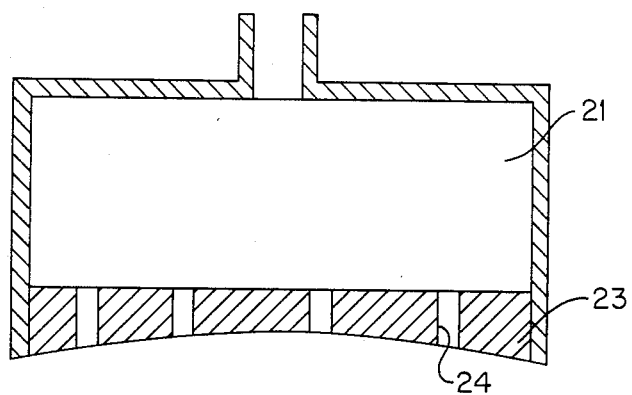

Embodiments of the invention will now be described by way of example with reference to the accompanying drawings, in which:

FIG. 1 is a sectional elevation through a film strip copying arrangement of the type with which the present invention is used and showing a drive sprocket which causes registration error between the film strips, FIG. 2 is a sectional elevation through the copying arrangement of FIG. 1 including a first form of displacement means according to the present invention, FIG. 3 is a sectional elevation through the copying arrangement of FIG. 1 including a second, preferred, form of registration means according to the present invention, FIG. 4 is an enlarged view depicting the curvature of the pad of the displacement means of FIG. 3.

Referring to FIG. 1 film copying apparatus 10 includes a light source 11 and an exposure gate 12. A strip 13 of film to be copied (the master film) is placed in contact with a strip 14 of unexposed film (the copy film) and both are drawn past the exposure gate by a toothed drive sprocket 15, the teeth 16 (one only shown) of which engage with sprocket holes 17 (one only shown) in both the master and copy film strips.

To ensure that each film strip is engaged cleanly and moved smoothly the sprocket teeth have curved leading and trailing edges. As will be seen from FIG. 1 the engagement of the sprocket holes at the different levels of tooth profile effectively introduces a displacement between them longitudinally of the strips in that the upper (copy) film lags. This displacement causes the image frame transferred at the exposure gate to be advanced relative to the sprocket holes associated with that frame so that when the new film strip is positioned in a moving-map instrument by means of the sprocket holes, a wrong area of the map image is presented as an indication of position.

In accordance with the present invention it is proposed to employ registration means to eliminate the lag of the film strip at the exposure gate by diverting the path of the upper strip between the exposure gate and the first sprocket tooth to increase its path length relative to the lower strip and one arrangement for achieving this is shown in FIG. 2. The general arrangement is similar to that described with reference to FIG. 1 and like parts are given the same reference numerals.

The master film strip 13 and copy film strip 14 are run through the exposure gate in contact, the emulsion of the copy film adjacent the master film. After the strips leave the exposure gate they are separated by diversion means 18 in the form of a needle-like rod 19 extending parallel to the planes of the film strips in a direction transversely to their direction of motion. The rod 19 is movable in position perpendicularly to the plane of the master film strip and bears on the underside of the upper strip to raise it clear of the lower strip. The diverted strip has a slightly longer path length to the first sprocket tooth than does the master film and consequently is advanced with respect to the master film as they pass through the exposure gate. The degree of advance is a function of the displacement of the rod which may be adjusted with a micrometer device (not shown) to make the relative longitudinal advance equal to the longitudinal lag introduced by the sprocket tooth curvature.

The above described arrangement of registration means is simple to implement but may also be considered to have drawbacks. For instance, the lower emulsion coated surface of the copy film is in contact with the rod as it is drawn across it. This may lead to scratching or other damage to the film or emulsion surface due to wearing of the rod and due to any dirt particle trapped between them. Also the rod is necessary of small diameter and also subsceptible to damage.

A preferred form of registration means is shown in the elevation of FIG. 3, those parts common to FIGS. 1 and 2 being numbered likewise.

The master and copy film strips 13 and 14 respectively are together drawn past the exposure gate 12 by drive sprocket 15, the first tooth 16 of which engages with sprocket holes 17. The registration means is also a form of diversion means 20 for the upper web and comprises suction means being a vacuum chamber 21 connected by pipe 22 to a vacuum pump (not shown) and having one wall 23 comprising a polished pad containing a plurality of through apertures 24. The vacuum chamber is coupled to positioning means formed by an adjustment screw 25 by which its position is adjustable relative to the plane of the master film 13.

In operation the vacuum chamber is lowered until the pad 23 abuts the upper of the two film strips, drawing in air and any potentially harmful dust particles as it approaches the surface. When in contact with the upper film strip though apertures are closed off by the strip and the pressure difference across the strip holds it in contact with the pad face while being drawn across it by the drive sprocket. The screw 25 of the positioning means is then adjusted raising the vacuum chamber and the upper film strip.

Because the sprocket holes of both film strips are held on sprocket tooth 16 the longer path length taken by the copy film strip results in an advance of the copy film strip relative to the master films at the exposure gate. The position of the vacuum chamber set by screw 25 may be set empirically to ensure that both film strips are aligned as they pass the exposure gate, that is, that their sprocket holes are in registration. In its simplest form this comprises examining the positional accuracy of the material copied onto a film and adjusting the registration means until the copying arrangement produces a copy film in full registration with the master film strip.

This arrangement of diversion means will be seen to have the advantages of robustness, contact only with the non-emulsion face of the copy film, an inherent 'vacuum cleaning' action to remove potentially damaging dirt particles from the film surface prior to contact and the ability to operate down to zero separation between film strips.

The wall 23 comprising the pad may be formed of a hard metal such as high carbon tool steel or may be formed of a softer metal e.g. brass plated with a more abrasion resistant material such as hard chromium or nickel. Other, non-metallic, materials may be employed providing the requirement for resistance to abrasion by the moving film is met.

As shown in FIG. 4, the face of the pad 23 may also be formed with a slightly concave profile so that it conforms substantially to the path taken by the diverted film strip 14 where they engage.

The above described technique of establishing registration between the two film strips may be extended to include a control loop by which any departure from registration between the films is monitored at the exposure gate and the positioning of the diversion means adjusted to restore a condition of registration. Clearly the measurement of departure from resistration requires to avoid exposure problems of the film.

We claim:

1. Film copying apparatus comprising:
   an exposure gate;
   a drive sprocket engaging in holes in contiguous strips of film for pulling the film strips past the exposure gate, the drive sprocket, by virtue of the sprocket teeth profile, introducing a longitudinal displacement between strips; and
   diversion means operable to divert the path of the lagging strip out of the plane of the path taken by the other strip between the exposure gate and the drive sprocket by an amount which causes said lagging strip to be longitudinally advanced, relative to the other strip, at the exposure gate by the same amount as the longitudinal displacement introduced by the drive sprocket teeth.

2. Film copying apparatus as claimed in claim 1 in which the diversion means comprises suction means operable to hold the film strip in contact therewith as the strip is moved past and positioning means operable to move the suction means perpendicularly to the plane containing the direction of motion of the film strip.

3. Film copying apparatus as claimed in claim 2 in which the suction means comprises a chamber arranged to be coupled to a vacuum and having one wall thereof formed as a pad containing a plurality of through apertures by way of which suction is applied to the film surface.

4. Film copying apparatus as claimed in claim 3 in which the face of the pad against which the film is held is formed of polished high carbon tool steel.

5. Film copying apparatus as claimed in claim 3 in which said apertured wall has a concave curvature conforming substantially to the shape assumed by the path of the diverted film strip at the point of engagement therewith.

* * * * *